United States Patent

Traylor

[15] 3,645,555
[45] Feb. 29, 1972

[54] TANDEM AXLE SUSPENSION
[72] Inventor: Charles O. Traylor, Springfield, Mo.
[73] Assignee: Hutchens and Son Metal Products, Inc., Springfield, Mo.
[22] Filed: Dec. 11, 1969
[21] Appl. No.: 884,373

[52] U.S. Cl. ..........................280/104.5 B, 267/52, 267/54, 267/56
[51] Int. Cl. .............................................B60g 5/06
[58] Field of Search ..................267/52, 54, 56; 280/104.5 B

[56] References Cited

UNITED STATES PATENTS

| | | | |
|---|---|---|---|
| 2,446,877 | 8/1948 | Jones | 280/104.5 B |
| 2,788,222 | 4/1957 | Wilson | 280/104.5 B |
| 3,080,161 | 3/1963 | Felburn | 280/104.5 B X |
| 3,194,580 | 7/1965 | Hamlet | 280/104.5 B |

*Primary Examiner*—Philip Goodman
*Attorney*—Cushman, Darby & Cushman

[57] ABSTRACT

A tandem axle suspension whereby each of the tandem axles is fastened to an associated spring by means of an axle seat assembly and each of the springs is nonslidably connected at one end to an equalizer assembly which is fastened to the frame of the vehicle and slidably connected at the other end to hanger brackets likewise fastened to the frame. The springs are fixed to a pivot beam on the equalizer assembly, preferably at a point below the axis of rotation of the pivot beam, so that during acceleration and deceleration, the tendency of the wheels to impart undesirable rotation to the axles, with resultant rotation of the beam, is opposed by horizontal forces generated by the springs on the pivot beam at the points of attachment of the springs to the pivot beam. In the embodiment of the invention described below, the springs each are clamped to the axle by means of a pair of serrated plates, one of which is movable with respect to the other to vary the separation between the axle and the end of the spring fixed to the pivot beam.

5 Claims, 9 Drawing Figures

Patented Feb. 29, 1972
3,645,555
4 Sheets-Sheet 1
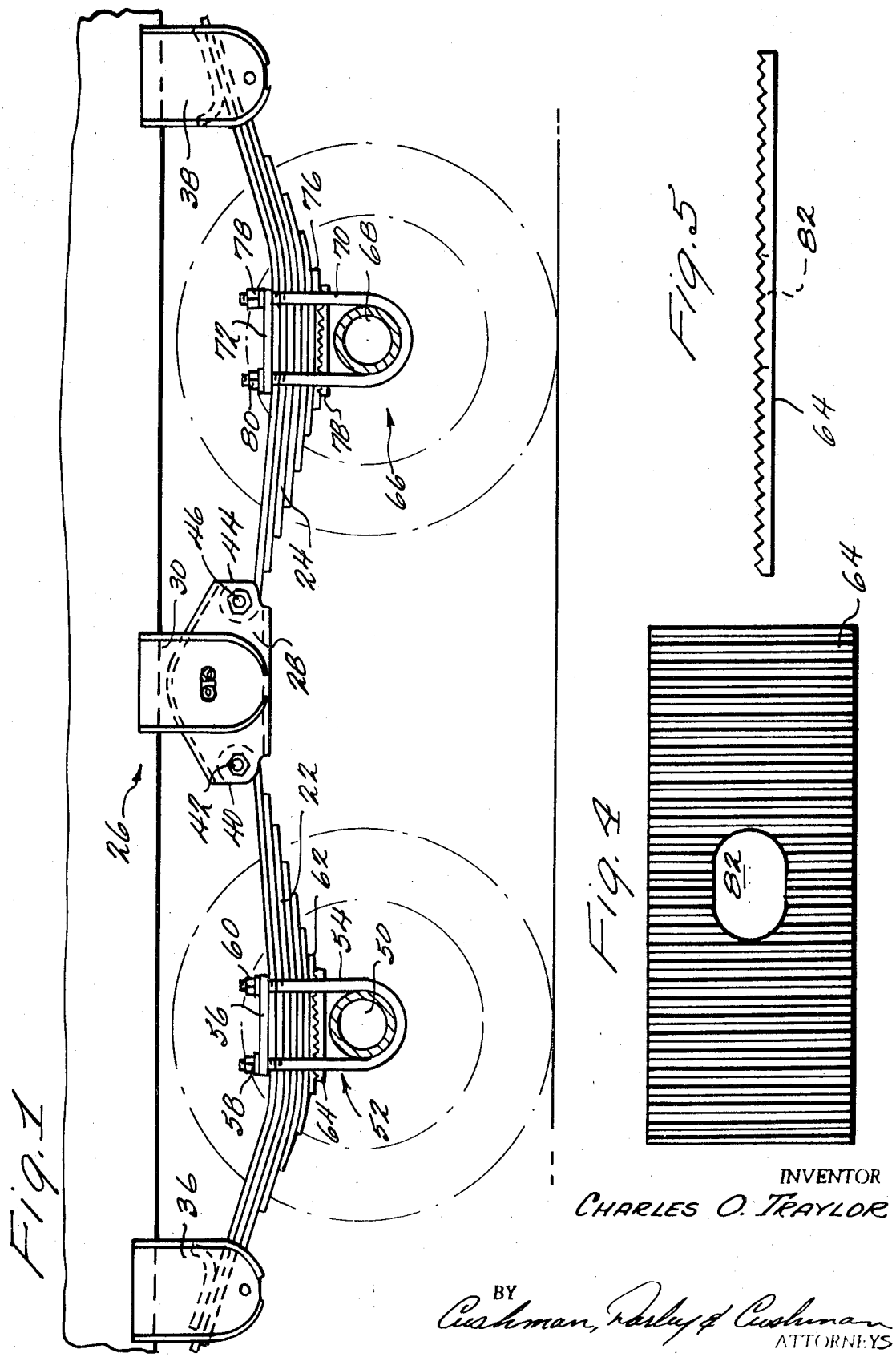
INVENTOR
CHARLES O. TRAYLOR
BY Cushman, Darby & Cushman
ATTORNEYS

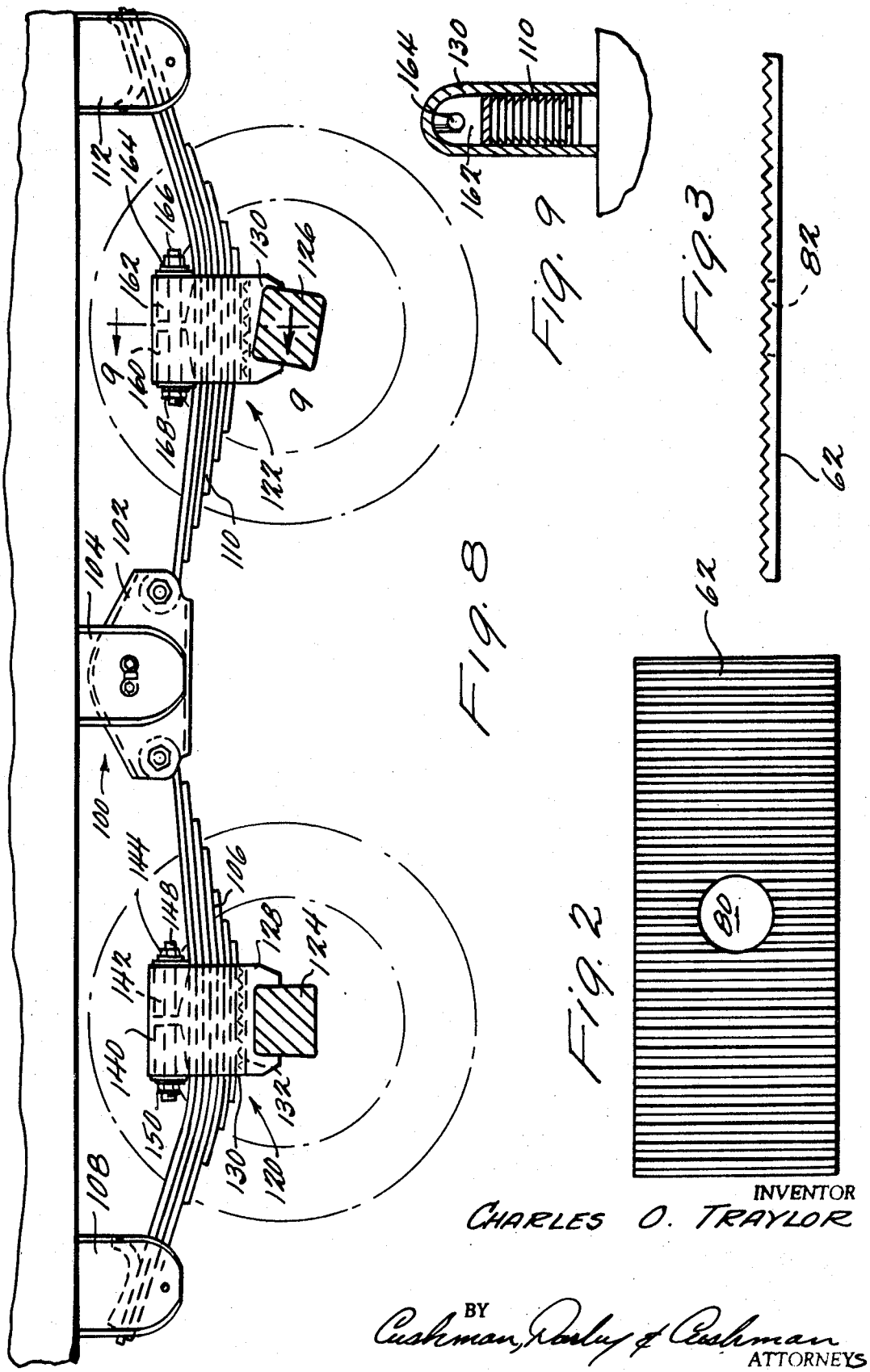

3,645,555

TANDEM AXLE SUSPENSION

BRIEF DESCRIPTION OF THE PRIOR ART AND SUMMARY OF THE INVENTION

The invention relates to a tandem axle suspension for use in heavy-duty highway transport vehicles.

Many large, heavy-duty highway transport vehicles are driven on a number of tandem axles. Conventionally, these tandem axles are connected to the vehicle frame by one or more suspension units, each including one or more elliptical springs associated with each of the two axles. An equalizer assembly is usually mounted on the frame at a location roughly midway between the two axles and this assembly includes a pivot beam which is free to rotate about an axis substantially parallel to the two axles and to which one end of each of the springs is slidably connected. The other end of each of the springs is connected to respective hanger brackets which are also fixed to the frame.

However, with this type of suspension, application of drive torque to the wheels tends to impart a rotation of the axles in one direction with a corresponding rotation of the beam in the opposite direction as the end of one of the springs attached to the pivot beam rises and the end of the other spring attached to the pivot beam falls. This axle roll, if uncontrolled, can cause misalignment and binding in the drive lines of the axles and also produces an undesirable weight transfer from one axle to the other which, in turn, induces a shift of tractive force to the heavier axle which is detrimental to vehicle control. The application of a braking torque to the wheel causes rotation of the axles and the pivot beam in directions opposite to those caused by the application of a drive torque and similarly produces the same undesirable results.

One way that such undesirable and uncontrolled axle roll can be reduced is by means of torque arms which connect the axle seat assembly to the pivot beam. Such an arrangement is described, for example, in the Ward U.S. Pat. No. 3,074,738. However, such torque arms or radius rods, as they are frequently termed, add considerably to the expense of the suspension and are otherwise unsatisfactory.

The invention of this application, as described in detail below, relates to a novel suspension in which the spring ends are fixedly rather than slidably connected to the pivot beam so that the application of drive and braking torque generate horizontal forces at the points of attachment of the springs to the pivot beam which oppose axle roll without the necessity for conventional torque arms or radius rods. Further, as described in detail below, in one embodiment of the invention, provision is made for adjusting the separation between the axle seat assembly and the pivot beam so that the suspension can be used with different vehicles. A pair of serrated plates are each positioned around the center stud of the spring one as part of the spring and one as part of the axle seat assembly. The teeth of the serrated plates engage when the leafs of the spring are clamped together but can be released to move the axle seat assembly longitudinally.

Many other objects and purposes of the invention will become clear from the following detailed description of the drawings.

BRIEF DESCRIPTION OF THE DRAWINGS

FIG. 1 shows one embodiment of the suspension of this application;

FIG. 2 shows a top view of one of the serrated plates;

FIG. 3 shows a side view of the serrated plate of FIG. 4;

FIG. 4 shows a top view of the other of the serrated plates;

FIG. 5 shows a side view of the serrated plate of FIG. 4;

FIG. 8 shows another embodiment of the invention; and

FIG. 9 shows a view of the axle seat assembly of the embodiment of FIG. 8 along the lines 9—9'.

DETAILED DESCRIPTION OF THE DRAWINGS

Figure 6:
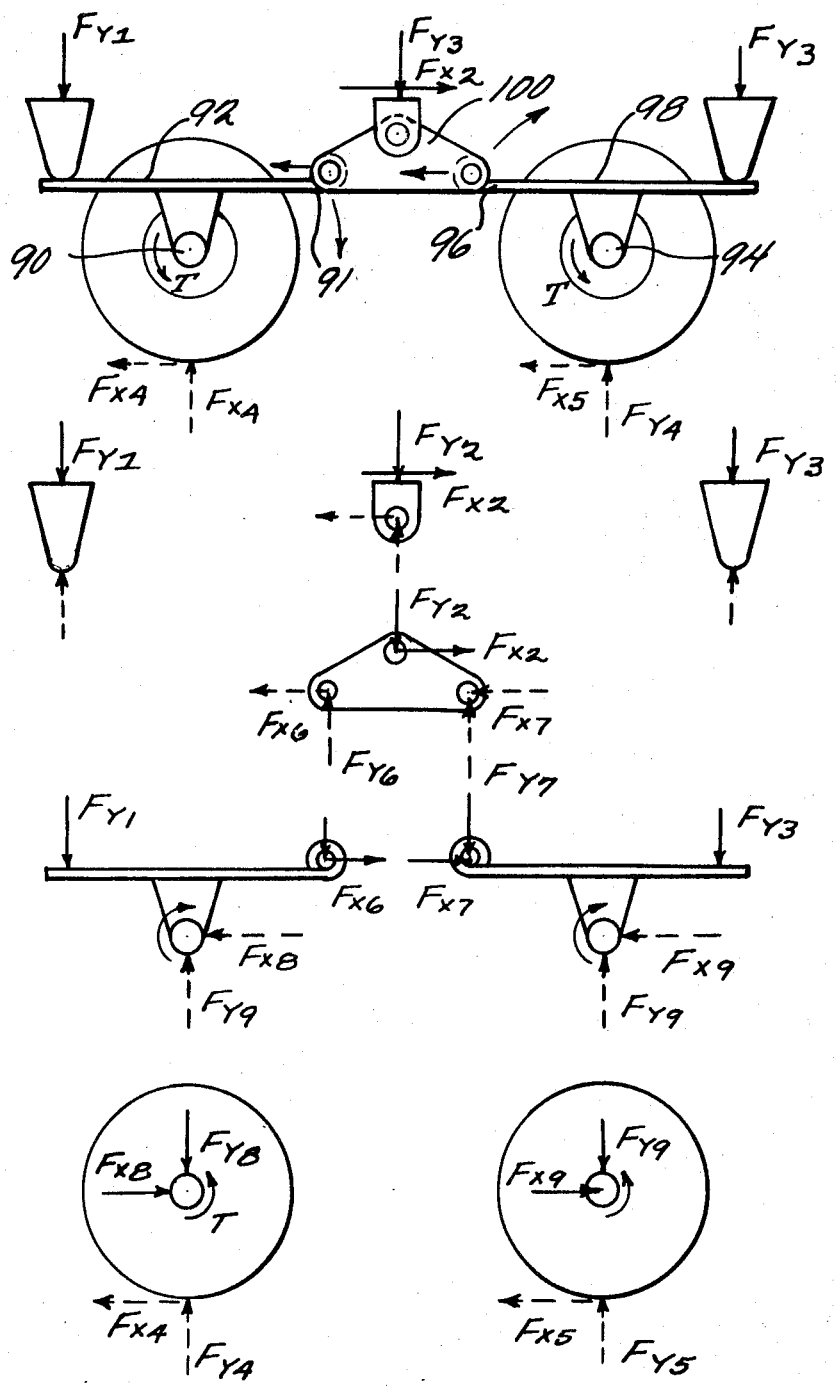
FIG. 6 shows a sector diagram of the loads and reaction of the novel suspension of this application under a drive torque.

Reference is now made to FIG. 1 which shows one embodiment of this invention for use with a tandem axle. As can be seen, a first number of conventional leaf springs are fastened rigidly together to form a semielliptical spring 22 and a second number of leaf springs are similarly fastened together to form a second semielliptical spring 24. Further, as mentioned briefly above, an equalizer assembly 26 is mounted approximately midway between the two tandem axles, and assembly 26 includes a pivot beam 28 and an equalizer bracket 30. Equalizer bracket 30 is rigidly fixed to the frame of the vehicle, for example, by suitable bolts and pivot beam 28 is pivotably attached to bracket 30 as shown so as to be rotatable about an axis substantially parallel to the axes of the two axles.

Further, hanger brackets 36 and 38 are likewise fixed permanently to the frame. One end of spring 22 is slidably connected to hanger bracket 36 as shown and similarly one end of the spring 24 is slidably connected to hanger bracket 38. The other end of spring 22 is fixedly connected to pivot beam 28 at a point which is below the center of rotation of pivot beam 28, which is its point of attachment to the equalizer bracket 30. In the embodiment of the invention illustrated in FIG. 1, the top leaf of spring 22 is constructed with an eye 40 at its end and a suitable bolt 42 passes through eye 40 and thus couples spring 22 pivotably to pivot beam 28 so that spring 22 can exert a horizontal force on beam 22. The top leaf of spring 24 is similarly provided with an eye 44 and a similar bolt 46 connects spring 24 pivotably to pivot beam 28. As will be apparent from the discussion below, fixing the springs 22 and 24 to the pivot beam 28 in this fashion results in the production of horizontal forces at the points of connection of the springs to the pivot beam 28 which, at least in part, oppose the rotation of pivot beam 22 which results from axle roll. In this fashion the adverse effects of such axle roll are reduced or substantially eliminated.

In the embodiment of FIG. 1, axle 50 is connected to spring 22 by an axle seat assembly 52 which is designed to be longitudinally adjustable along the length of the spring 22 so that the novel suspension illustrated in FIG. 1 can be used with a variety of vehicles having slightly differing separation between the tandem axles. In FIG. 1, an eyebolt 54 is preferably welded to axle 50 together with another eyebolt which cannot be seen but which is located directly behind eyebolt 54. These eyebolts each pass on one side of the spring 22 and connect to a plate 56 by means of nuts such as nuts 58 and 60. When the nuts 58 and 60 are tightened in place, the eyebolt 54 and the other eyebolt behind it will be locked rigidly to spring 22 and the axle is thereby permanently affixed to assembly 52 and spring 22.

Further, as discussed briefly above, a first serrated plate 62 is permanently connected to the lower leaf of spring 22 and plate 62 engages the teeth of a similar plate 64 which is affixed to eyebolt 54 and the other eyebolt associated with it. When nuts 58 and 60 associated with eyebeam 54 and the other nuts associated with the eyebolt behind it are fastened tightly in place, the teeth on plates 62 and 64 are engaged and prevent movement of plate 62 with respect to plate 64. However, when the nuts are loosened, the plates can be moved relative to one another to the correct location before the nuts are once again tightened to rejoin the axle seat assembly 52 to spring 22.

The axle seat assembly 66, associated with axle 68, operates in a similar fashion with eyebolt 70 cooperating with another eyebolt hidden behind it and fastening to a plate 72 by means of nuts 78 and 80 to connect axle seat assembly 66 to spring 24. Serrated plates 76 and 78 are likewise provided for adjusting the position of axle seat assembly 66 in the manner described above.

The plates 62 and 64 and the plates 76 and 78 are preferably provided with apertures such as can be seen in FIGS. 2–5. The plate 62 has an aperture 80 which is only slightly larger than the stud bolt which conventionally holds together the leaf springs making up the semielliptical spring 22 so that the plate 60 in effect is prevented from moving along the length of the spring. However, the plate 64, as can be seen in FIG. 4, is preferably provided with an elliptically shaped aperture 82 so that it can be moved relative to plate 62 to accomplish the adjustment described above.

As mentioned briefly above, the novel arrangement of this invention, as shown in FIG. 1, responds to the application of drive and braking torque by generating horizontal forces at the points of attachment of springs 22 and 24 to pivot beam 28. These forces oppose the tendency of pivot beam 28. These forces oppose the tendency of pivot beam 28 to rotate caused by axle roll and thus tend to prevent axle roll and its undesirable consequences. FIG. 6 shows a vector diagram of the loads and reactions of the various components of a suspension such as shown in FIG. 2 when a drive torque is applied. It should be apparent from FIG. 1 that the illustrated connection of the springs 22 and 24 to the pivot beam 28 causes a horizontal force to be applied to pivot beam 28 at each of the points of connection of springs 22 and 24 to pivot beam 28. As shown, both of these forces are in the same direction.

In the embodiment illustrated in FIG. 6, the application of a drive torque to the wheels tends to impart a clockwise rotation to each of the axles. The clockwise rotation of the front axle 90 tends to cause one end 91 of somewhat diagrammatically illustrated spring 92 to fall while the same driving torque applied to axle 94 tends to cause the end 96 of spring 98 to rise. These two applied forces pivot the beam 100 in a counterclockwise direction with the undesirable results discussed above. However, as should be apparent from the vector diagram illustrated in FIG. 6, the application of a driving torque also causes a horizontal force, which in FIG. 6 is labeled $F_{x6}$, to be applied by the end of the spring 92 to pivot beam 100 in a direction to the right, while the spring 96 likewise applies a horizontal force labeled $F_{x7}$ to the pivot beam 100 which also urges it to the right. These two horizontal forces thus tend to rotate the pivot beam 100 in a clockwise direction opposing the rotation resulting from axle roll. Thus, axle roll is eliminated or at least substantially reduced.

Figure 7:
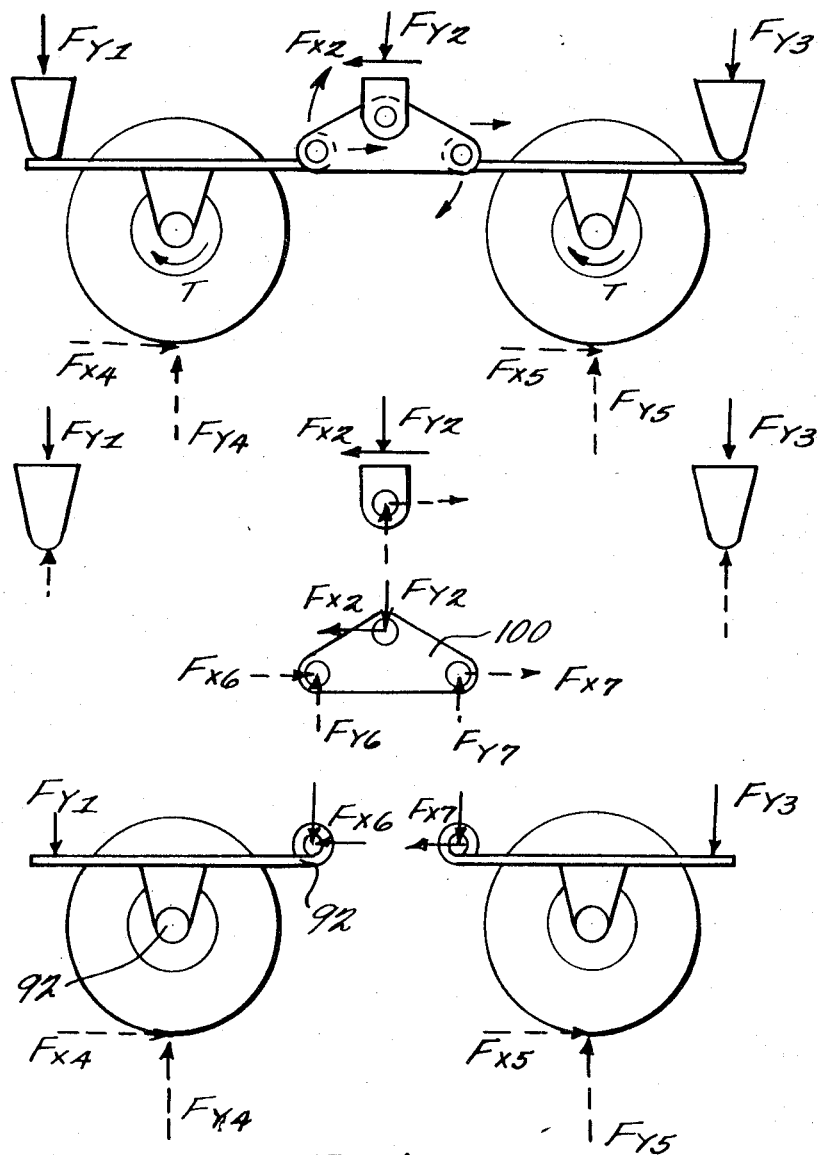
FIG. 7 shows a sector diagram of the loads and reaction of the novel suspension of this application under braking torque.

FIG. 7 shows a similar vector diagram illustrating the effects of applying a braking torque to the novel suspension of this application. With braking torque, the roll of the axle will, of course, be opposite to the direction of roll resulting from a drive torque. In FIG. 7, the roll will be therefore counterclockwise, thus causing a clockwise rotation of pivot beam 100. As occurs when a drive torque is applied, horizontal forces $F_{x6}$ and $F_{x7}$ in FIG. 7 are generated which tend to rotate pivot beam 100 in a clockwise direction, opposing the counterclockwise rotation of pivot beam 100 which results from axle roll. Accordingly, it should be apparent from the above vector diagrams that use of the novel suspension system of this application will result in much better control of the vehicle and the elimination of the undesirable results of axle roll.

Reference now is made to FIG. 8 which shows another similar embodiment of the invention. In FIG. 8, as in FIG. 1, an equalizer assembly 100 is provided with a pivot beam 102 and a bracket 104. The elliptical spring 106 is slidably connected at one end to a hanger bracket 108 which is firmly fixed to the frame and is pivotably fixed at its other end to pivot beam 102 at a location below the point of attachment of pivot beam 102 to bracket 104. Similarly, spring 110 is slidably connected at one end to bracket 112 which is fixed to the frame and at the other end to pivot beam 102. As in the embodiment of the invention discussed above with regard to FIG. 1, fixing the springs to the pivot beam in this fashion causes horizontal forces to be generated during the application of drive and braking torque which oppose the rotational forces produces by axle roll, thus substantially reducing or eliminating axle roll and its undesirable effects.

In the embodiment of FIG. 8, however, the axle seat assemblies 120 and 122 include axle members 124 and 126 which are preferably welded to the axle at any desired angular relation and U-shaped members 128 and 130 which respectively pass over the springs 106 and 110. Serrated plates 132 and 134 are associated with the assembly 112 and operate in the same fashion as described above, with plate 132 being fixed to springs 106 and plate 134 being fixed to U-shaped bracket 128. A pair of wedge-shaped members 140 and 142 are adapted to be fitted into the space of the U-shaped bracket above spring 106 and a stud member 144 having threads on both ends is adapted to be passed through the wedge members so that when nuts 148 and 150 are applied to the threads of stud 144 and tightened in place, the wedges move toward each other and force the serrated plates 132 and 134 together and couple the bracket 128 solidly to axle 124. Wedge members 160 and 162 are similarly associated with the axle seat assembly 122 and a stud 164 passes through the upper portion of bracket 130. Nuts 166 and 168 are fastened on stud 164 to urge the wedge members 160 and 162 toward each other and to lock the seat firmly in place. As can be seen in FIG. 9, each of the wedge members is preferably provided with longitudinally extending aperture so that the wedges can be easily removed after the associated stud 144 or 164 has been removed.

Many changes and modifications of the invention illustrated in the drawings will of course be possible. Accordingly, the scope of the invention tends to be limited only by the scope of the appended claims.

What is claimed is:

1. A tandem axle suspension for a vehicle comprising:
  an equalizer assembly including an equalizer bracket fixed to the frame of said vehicle and a pivot beam pivotably connected to said equalizer bracket so as to be rotatable about an axis roughly parallel to the tandem axles,
  a first hanger bracket fixed to said frame,
  a first spring slidably connected at one end to said first hanger bracket and pivotably connected at the other end to said pivot beam at a point below the axis of said pivot beam so that during the application of drive and braking torque said first spring applies a first horizontal force to said pivot beam opposing the rotation of said beam caused by axle roll,
  a first axle seat assembly connecting a first axle to said first spring,
  a second hanger bracket fixed to said frame,
  a second spring slidably connected at one end to said second hanger bracket and pivotably connected at the other end to said pivot beam at a point below the axis of said pivot beam so that during the application of drive and braking torque said second spring applies a second horizontal force, in the same direction as said first force, opposing the rotation of said beam caused by said axle roll, and
  a second axle seat assembly connecting a second axle to said second spring.

2. A suspension as in claim 1 wherein said springs are semielliptical and are comprised of a plurality of leafs.

3. A suspension as in claim 1 wherein said first and second seat assemblies each include a bracket member for receiving a spring and an axle, a first plate attached to the associated spring and having a plurality of teeth on one side thereof, a second plate attached to said bracket member having a plurality of teeth on one side thereof for engaging the teeth of said first plate and movable with respect to said first plate when said teeth are not engaged so as to adjust the point of connection of the axle to the spring and means for forcing the teeth of said first and second plates together and locking the spring and axle to said bracket member.

4. A suspension as in claim 3 wherein said bracket member includes a U-shaped bolt having threaded ends and said forcing means includes a top plate for receiving the threaded ends of said bolt and a first and second nut for forcing said top plate against said spring and engaging the teeth of said first and second plates.

5. A suspension as in claim 3 wherein said bracket member includes a U-shaped member, an axle member fixed to said axle and to the open end of said U-shaped member, a first and second wedge member disposed in the closed end of said U-shaped member above the associated spring, a straight stud bolt having a first and second threaded end, and a first and second nut screwable on said stud bolt for forcing said wedge members into said closed end so as to force said first and second plates together and lock the spring and axle to said bracket member.

* * * * *